US012658198B2

(12) United States Patent
(10) Patent No.: US 12,658,198 B2
(45) Date of Patent: *Jun. 16, 2026

Mosayyebpour Kaskari

(54) LOW-LATENCY SPEECH ENHANCEMENT

(71) Applicant: Synaptics Incorporated, San Jose, CA (US)

(72) Inventor: Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 18/179,149

(22) Filed: Mar. 6, 2023

(65) Prior Publication Data

US 2024/0304204 A1 Sep. 12, 2024

(51) Int. Cl.

| | |
|---|---|
| ***G10L 21/0232*** | (2013.01) |
| ***G10L 21/0208*** | (2013.01) |
| ***G10L 21/034*** | (2013.01) |
| ***G10L 25/18*** | (2013.01) |
| ***G10L 25/30*** | (2013.01) |

(52) U.S. Cl.

CPC .......... *G10L 21/0232* (2013.01); *G10L 25/18* (2013.01); *G10L 2021/02082* (2013.01); *G10L 21/034* (2013.01); *G10L 25/30* (2013.01)

(58) Field of Classification Search

CPC ... G10L 21/0232; G10L 25/18; G10L 21/034; G10L 25/30; G10L 2021/02082

See application file for complete search history.

(56) References Cited

U.S. PATENT DOCUMENTS

| | | | |
|---|---|---|---|
| 2008/0240463 A1 | 10/2008 | Florencio et al. |
| 2008/0247274 A1 | 10/2008 | Seltzer et al. |
| 2022/0148611 A1 | 5/2022 | Slapak et al. |

(Continued)

OTHER PUBLICATIONS

Hsu et al. "Robust Voice Activity Detection Algorithm Based on Feature of Frequency Modulation of Harmonics and Its DSP Implementation", IEICE Trans. Inf. & Syst., vol. E98-D, No. Oct. 10, 2015 (Year: 2015).*

(Continued)

*Primary Examiner* — Nicole A K Schmieder

(74) *Attorney, Agent, or Firm* — Paradice & Li LLP

(57) ABSTRACT

This disclosure provides methods, devices, and systems for audio signal processing. The present implementations more specifically relate to low-latency speech enhancement. In some aspects, a speech enhancement system may receive a number (B) of frames of a signal, where each of the B frames include a number (N) of time-domain samples. The speech enhancement system may transform the B*N time-domain samples into B*N first frequency-domain samples based on an N-point fast Fourier transform (FFT), and may further transform the B*N first frequency-domain samples into B*N second frequency-domain samples based on a B-point FFT. The speech enhancement system may determine a probability of speech in the signal based at least in part on the B*N second frequency-domain samples. In some implementations, the speech enhancement system may decimate the B*N second frequency-domain samples by a factor (D), and the probability of speech is determined based on the B*N/D decimated second frequency-domain samples.

20 Claims, 5 Drawing Sheets

(56) References Cited

U.S. PATENT DOCUMENTS

| | | | |
|---|---|---|---|
| 2022/0240026 | A1 | 7/2022 | Zahedi et al. |
| 2024/0257822 | A1* | 8/2024 | Mosayyebpour Kaskari .............. H04R 3/005 |

OTHER PUBLICATIONS

Park et al. "Voice Activity Detection in Noisy Environments Based on Double-Combined Fourier Transform and Line Fitting", Sci. World Journal, 2014 (Year: 2014).*

Raychowdhury et al. "A 2.3 nJ/Frame Voice Activity Detector-Based Audio Front-End for Context-Aware System-On-Chip Applications in 32-nm CMOS", IEEE Journal of Solid-State Circuits, vol. 48, No. 8, Aug. 2013 (Year: 2013).*

Souden et al., "A study of the LCMV and MVDR Noise Reductionfilters," IEEE Trans. Signal Process., vol. 58, No. 9, pp. 1925-4935, Sep. 2010.

Tashev et al., "Unified Framework for Single Channel Speech Enhancement," IEEE Pacific Rim Conference on Communications, Computers and Signal Processing, 6 pages, Aug. 2009.

U.S. Appl. No. 18/160,296, filed Jan. 26, 2023, entitled "Spatio-Temporal Beamformer", 52 pgs.

* cited by examiner

LOW-LATENCY SPEECH ENHANCEMENT

TECHNICAL FIELD

The present implementations relate generally to signal processing, and specifically to low-latency speech enhancement in audio signals.

BACKGROUND OF RELATED ART

A personal sound amplification product (PSAP) is a device that can amplify environmental sounds. However, a PSAP generally amplifies all sounds in an environment, including background noise. By contrast, a personal voice amplification product (PVAP) may enhance speech (such as speech from the user of the PVAP and/or from other persons in an environment) in the environmental sounds. Speech enhancement is a signal processing technique that attempts to suppress noise in an audio signal without distorting speech in the audio signal. Many existing speech enhancement techniques rely on statistical signal processing algorithms that continuously track the pattern of noise in each frame of the audio signal to model a spectral suppression gain or filter that can be applied to the audio signal in a time-frequency domain.

Some modern speech enhancement techniques implement machine learning to model a spectral suppression gain or filter that can be applied to the received audio signal in the time-frequency domain. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

The frequency resolution of signals input into the neural network can affect the accuracy and precision of the inferencing result. More specifically, a neural network tends to produce more accurate inferencing results for input signals having higher frequency resolutions than for input signals having lower frequency resolutions. As such, neural network architectures may use significant processing power to achieve effective speech enhancement, resulting in high power consumption and high latency. However, many PVAPs have low latency and low power consumption constraints. Thus, there is a need to reduce the power consumption and latency of speech enhancement techniques that implement machine learning architectures.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of speech enhancement. The method includes receiving a number (B) of frames of an input signal, each of the B frames including a number (N) of time-domain samples; transforming the B*N time-domain samples into B*N first frequency-domain samples based on an N-point fast Fourier transform (FFT); transforming the B*N first frequency-domain samples into B*N second frequency-domain samples based on an B-point FFT; and determining a probability of speech in the input signal based at least in part on the B*N second frequency-domain samples.

Another innovative aspect of the subject matter of this disclosure can be implemented in a in a speech enhancement system, including a processing system and a memory. The memory stores instructions that, when executed by the processing system, cause the speech enhancement system to receive a number (B) of frames of an input signal, each of the B frames including a number (N) of time-domain samples; transform the B*N time-domain samples into B*N first frequency-domain samples based on an N-point fast Fourier transform (FFT); transform the B*N first frequency-domain samples into B*N second frequency-domain samples based on an B-point FFT; and determine a probability of speech in the input signal based at least in part on the B*N second frequency-domain samples.

BRIEF DESCRIPTION OF THE DRAWINGS

The present implementations are illustrated by way of example and are not intended to be limited by the figures of the accompanying drawings.

DETAILED DESCRIPTION

Figure 1:
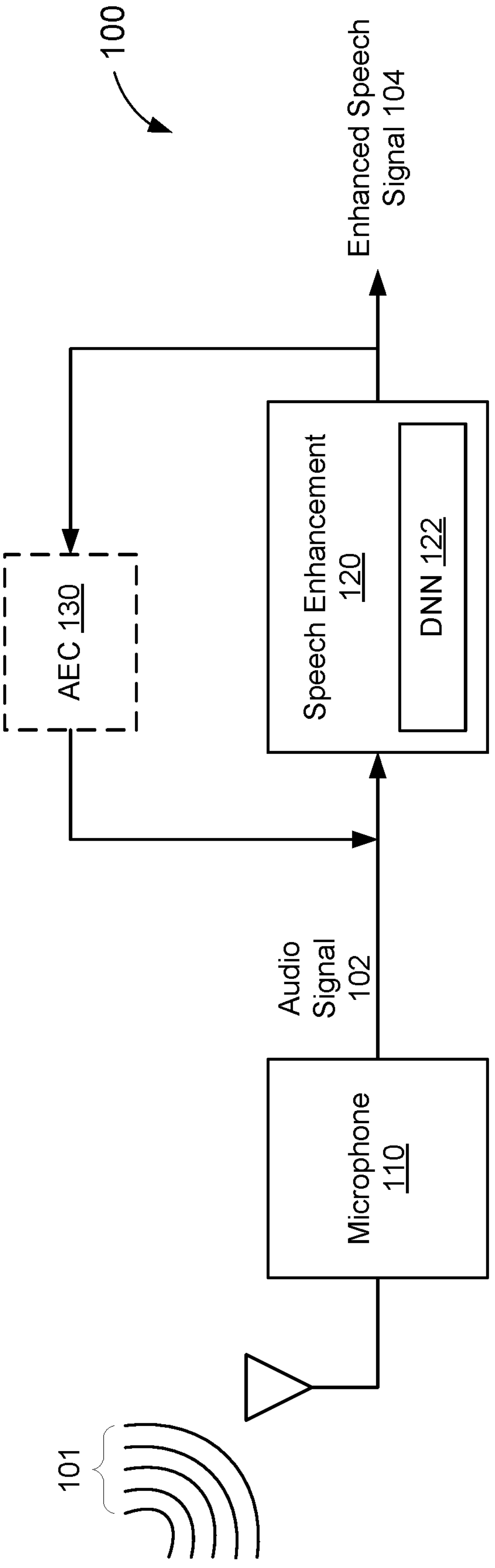
FIG. 1 shows an example audio receiver that supports single channel speech enhancement.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result.

The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, many modern speech enhancement techniques (such as those implemented by PVAPs) implement machine learning to model a spectral suppression gain or filter that can be applied to a received audio signal in the time-frequency domain. Machine learning, which generally includes a training phase and an inferencing phase, is a technique for improving the ability of a computer system or application to perform a certain task. Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system).

The frequency resolution of signals input into the neural network can affect the accuracy and precision of the inferencing result. More specifically, a neural network tends to produce more accurate inferencing results for input signals having higher frequency resolutions than for input signals having lower frequency resolutions. As such, neural network architectures may use significant processing power to achieve effective speech enhancement, resulting in high power consumption and high latency. However, many PVAPs have low latency and low power consumption constraints. For example, low latency signal processing is needed to produce enhanced audio in real-time or near real-time.

Reducing the frequency resolution of the input audio signals may lower the latency of speech enhancement. However, lowering the frequency resolution of an audio signal reduces the number of samples used to represent the audio signal in the frequency domain. Neural networks that are trained on fewer frequency-domain samples (or audio signals having lower frequency resolution) to tend produce less accurate inferencing results for speech enhancement. However, aspects of the present disclosure recognize that multiple frames of an audio signal sampled at a lower frequency resolution can be combined to generate a signal that simulates a signal sampled at a high frequency resolution, suitable for use in neural networks for speech enhancement.

Various aspects relate generally to audio processing, and more particularly, to low-latency speech enhancement. In some aspects, a speech enhancement system may include a deep neural network (DNN). The DNN is configured to receive an input audio signal and infer a probability of a speech component (also referred to as "probability of speech") in the input audio signal based on a neural network model. A subband analysis module may transform the input audio signal from a time domain to a coarse frequency domain. A buffer may store multiple frames of the transformed audio signal. A fine domain mapping module may further transform the stored frames of the transformed audio signal to a signal that simulates an audio signal sampled in a fine frequency domain, and the further transformed signal may be input into a DNN module implementing the DNN. The DNN module may generate a probability of speech in the fine frequency domain based on the further transformed signal. A coarse domain mapping module may map the probability of speech to the coarse frequency domain. A mixer module may use the probability of speech to generate an enhanced output audio signal (e.g., by multiplying the transformed input signal in the coarse frequency domain with the probability of speech in the coarse frequency domain).

Particular implementations of the subject matter described in this disclosure can be implemented to realize one or more of the following potential advantages. By transforming multiple frames of an audio signal in the coarse frequency domain to a signal that simulates a signal in the fine frequency domain, aspects of the present disclosure can perform speech enhancement effectively while meeting constraints for lower latency and lower power consumption. More specifically, the latency and power consumption of the speech enhancement techniques can be controlled by sampling a signal at a certain rate associated with the coarse frequency domain and transforming that signal to a signal associated with a certain rate in the fine frequency domain. As such, the PVAP can be flexibly configured for desired latency and power consumption constraints while effectively enhancing speech in audio signals.

FIG. 1 shows an example audio receiver 100 that supports single channel speech enhancement. The audio receiver 100 includes a microphone 110 and a speech enhancement component 120. The microphone 110 is configured to convert sound waves 101 (also referred to as "acoustic waves") into an audio signal 102. Thus, the audio signal 102 is an electrical signal representative of the acoustic waveform. In some aspects, the microphone may be associated with a single audio channel. Thus, the audio signal 102 also may be referred to as a "single-channel" audio signal.

In some implementations, the sound waves 101 may include speech from the environment and/or user speech mixed with other environmental sounds, background noise, or interference (such as reverberant noise from a headset enclosure). Thus, the audio signal 102 may include a speech component and a noise component. The speech enhancement component 120 is configured to improve the quality of speech in the audio signal 102, for example, by suppressing the noise component or otherwise increasing the signal-to-noise ratio (SNR) of the audio signal 102. In some implementations, the speech enhancement component 120 may apply a spectral suppression gain or filter to the audio signal 102. The spectral suppression gain attenuates the power of the noise component of the audio signal 102, in a time-frequency domain, to produce an enhanced speech signal 104. Thus, the enhanced speech signal 104 may have a higher SNR than the audio signal 102.

In some implementations, the speech enhancement component 120 may determine a spectral suppression gain to be applied to the audio signal 102 based, at least in part, on a deep neural network (DNN) 122. For example, the DNN 122 may be trained to infer a likelihood or probability of speech in the time-frequency domain. Example suitable DNNs may include, among other examples, convolutional neural networks (CNNs) and recurrent neural networks (RNNs). During the training phase, the DNN 122 may be provided with a large number of audio signals containing speech mixed with background noise. The DNN 122 also may be provided with clean speech signals representing only the speech component of each audio signal (without background noise). The DNN 122 may compare the audio signals with the clean speech signals to determine a set of features that can be used to classify speech.

During the inferencing phase, the DNN 122 may determine a probability of speech in each frame of the audio signal 102, at each frequency index associated with the time-frequency domain, based on the classification results. The DNN 122 may further convert the probability of speech determined for each frequency index into a spectral suppression gain that can be used to suppress the noise component of the corresponding frame of the audio signal 102. For example, if there is a low probability of speech in a given frame of the audio signal 102 at a particular frequency index, the DNN 122 may apply a lower gain to reduce the power at that frequency index of the corresponding audio frame. As a result, the DNN 122 may dynamically attenuate the noise component of the audio signal 102 in the time-frequency domain.

As described above, the frequency resolution of the input audio signal generally affects accuracy of the inferencing result. More specifically, a neural network tends to produce more accurate inferencing results for input audio signals having higher frequency resolutions than for input signals having lower frequency resolutions. A device (e.g., the audio receiver 100) that processes signals with a high frequency resolution throughout the device would incur high power consumption and high latency. However, speech enhancement is often implemented in devices with low latency and low power consumption constraints (such as PVAPs). Example neural networks may produce accurate inferencing while meeting these latency and power constraints by sampling signals at a low frequency resolution and combining multiple frames of that signal into a signal that simulates a high frequency-resolution signal and allowing the neural network to generate inferencing results based on that simulated high frequency-resolution signal.

In some implementations, the audio receiver 100 may include an acoustic echo cancellation (AEC) module 130 that is configured to apply AEC to the enhanced speech signal 104. For example, the AEC module 130 may remove (e.g., subtract) the enhanced speech signal 104 from the audio signal 102 at the microphone 110 or at the input to the speech enhancement component 120. In other words, the enhanced speech signal 104 can be reused, in a feedback loop, to reduce or remove echo effects.

In some aspects, the audio receiver 100 may include additional modules or units for processing signals before or after the speech enhancement component 120. For example, the audio receiver 100 may include one or more equalizers, one or more dynamic range compression modules, volume control, an amplifier, or any combination thereof. In some implementations, the audio signal 102 may be processed by an equalizer (e.g., a microphone equalizer) or a high-pass filter before being input into the speech enhancement component 120. In some other implementations, the enhanced speech signal 104 may be processed by at least one of an equalizer, a dynamic range compression module, or an amplifier before being output via a speaker.

Figure 2:
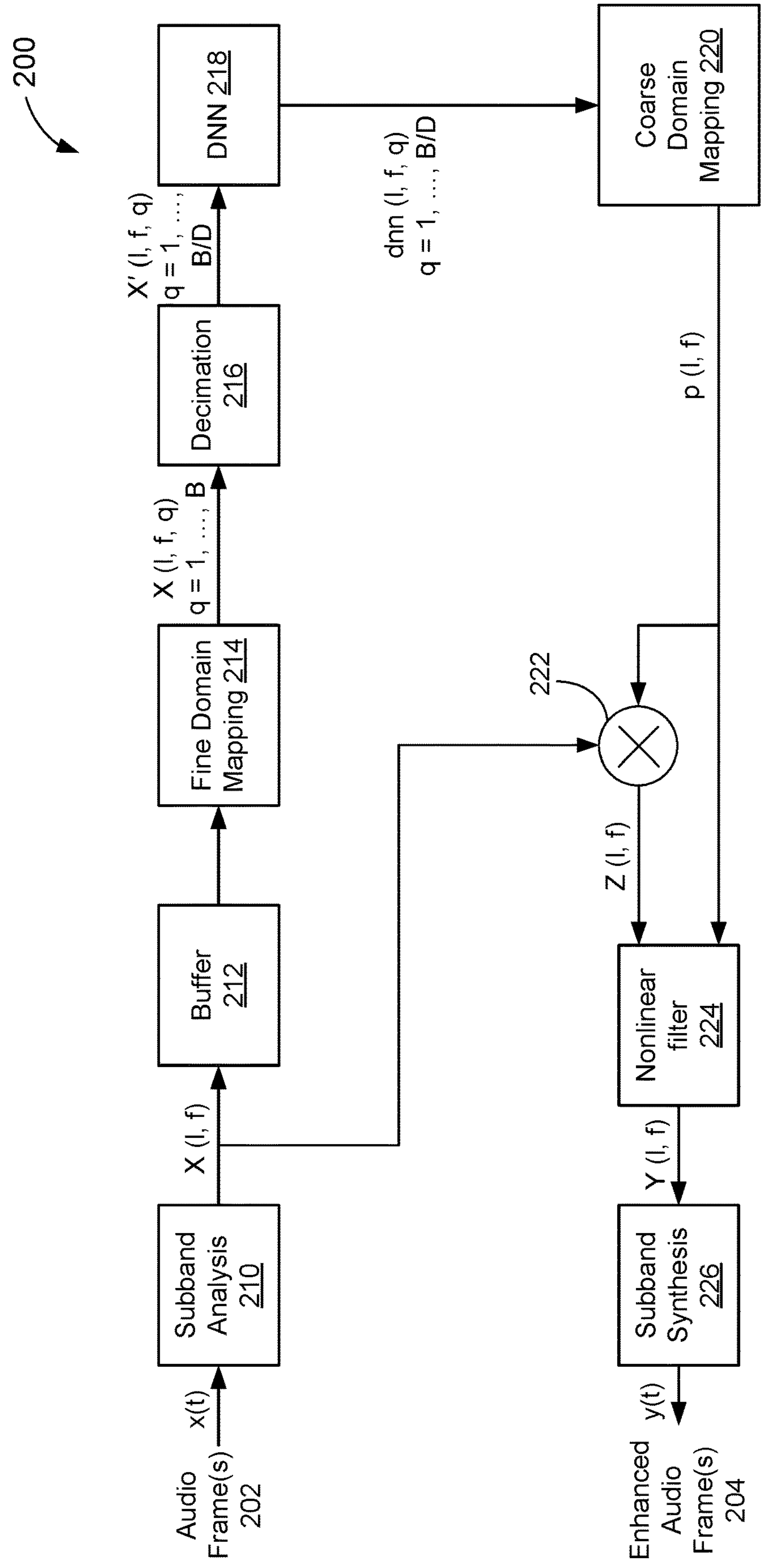
FIG. 2 shows a block diagram of an example speech enhancement system, according to some implementations.

FIG. 2 shows a block diagram of an example speech enhancement system 200, according to some implementations. In some implementations, the speech enhancement system 200 may be one example of the speech enhancement component 120 of FIG. 1. More specifically, the speech enhancement system 200 is configured to receive one or more frames 202 of an input audio signal x(t) and produce corresponding frame(s) 204 of an enhanced audio signal y(t) by enhancing speech and/or suppressing noise in the received audio frame(s) 202. The frame(s) 202 of the audio signal x(t) and the frame(s) 204 of the enhanced audio signal y(t) are signals associated with the time domain. With reference for example to FIG. 1, the input audio signal x(t) may be one example of the single-channel audio signal 102 and the enhanced audio signal y(t) may be one example of the enhanced speech signal 104.

The speech enhancement system 200 may include a subband analysis module 210, a buffer 212, a fine domain mapping module 214, a decimation module 216, a DNN module 218, a coarse domain mapping module 220, and a subband synthesis module 226. The subband analysis module 210 is configured to convert the input audio signal x(t) from the time domain to the time-frequency domain. For example, the subband analysis module 210 may transform a number (N) of time-domain samples, representing a frame 202 of the input audio signal x(t), to N frequency-domain samples representing a respective frame of an audio signal X(l,f) in the time-frequency domain, where l is a frame index, and f is a frequency index. In some implementations, the subband analysis module 210 may perform the transformation from the time domain to the time-frequency domain using a Fourier transform, such as a fast Fourier transform (FFT).

In some implementations, the subband analysis module 210 may transform the audio frame 202 into a frame of a time-frequency domain signal X(l,f) in the coarse domain, with N/2 frequency bins. That is, per frame l of the signal X(l,f), f can have N/2 values (e.g., f=1, . . . , N/2). More generally, N represents an FFT size associated with the coarse domain (also referred to below as FFTsize_coarse), which corresponds to a window or frame size of a frame sampling period of the input audio signal x(t); the FFT performed by the subband analysis module 210 is an N-point FFT. Further, the number of frequency domain samples per frame in the output of the N-point FFT is half of N, because half of the frequency spectrum in the output of the N-point FFT is redundant, and thus the signal X(l,f) can have N/2 frequency bins per frame. For example, given a sampling rate of 16 kilohertz (KHz) for the input audio signal x(t) and a window size of 8 milliseconds (ms), for the coarse domain, the FFTsize_coarse=N=128. Accordingly, the subband analysis module 210 may produce a time-frequency domain signal X(l,f) with N/2=64 frequency bins per frame. In some implementations, the subband analysis module 210 may transform audio frames 202 at an overlap rate of 50%. That is, consecutive audio frames 202 transformed by the subband analysis module 210 overlap by 50%. At an overlap rate of 50%, the subband analysis module 210 may output a frame of the signal X(l,f) at an interval that is half of the coarse domain window size (e.g., output a frame every 4 ms for a window size of 8 ms).

The buffer 212 is configured to store (e.g., buffer) a number (B) of frames of the time-frequency domain signal X(l,f). In some implementations, a size B of the buffer 212 is set as follows:

$$B = V * \frac{\text{FFTsize\_fine}}{\text{FFTsize\_coarse}}$$

where FFTsize_coarse is the coarse domain FFT size as described above, the FFTsize_fine is a FFT size associated with the fine domain and the DNN module 218, and V is a factor that is set based on the rate of overlap at which the subband analysis module 210 transforms audio frames 202. The DNN implemented by the DNN module 218 is trained on signals processed based on an FFT of size FFTsize_fine. For example, if the FFTsize_coarse is equal to 128, FFTsize_fine is equal to 512 (corresponding to a window size of 32 ms), and V=2, then the size B of the buffer 212 is equal to 8. That is, the buffer 212 can store 8 frames of the time-frequency domain signal X(l,f) at a time. In some implementations, if the overlap rate is 50%, then V=2. In some other implementations, V may be another, greater value that is also a power of 2 (e.g., V=4 for an overlap rate of 75%). The examples described herein assume, unless otherwise indicated, that FFTsize_coarse is equal to 128, FFTsize_fine is equal to 512, and V=2 (corresponding to an overlap rate of 50%). In some implementations, FFTsize_coarse, FFTsize_fine, and V are respectively powers of 2. Accordingly, B is also a power of 2.

The fine domain mapping module 214 is configured to map frames of the time-frequency domain signal X(l,f) (in the coarse domain) to a respective signal X(l,f,q) in the fine domain, where q is a sub-bin index indicating a number of sub-bins associated with a frequency bin (e.g., a given value of the frequency index f). In some implementations, the fine domain mapping module 214 may perform the mapping using an FFT of size B, and the number of sub-bins q per frequency bin is equal to B (e.g., q=1, . . . , B). Accordingly, if B=8, then the fine domain mapping module 214 applies an 8-point FFT to the time-frequency domain signal X(l,f) for each value of frequency bin index f, resulting in a signal X(l,f,q), where q=1, . . . , 8 for each value of f. More generally, the fine domain mapping module 214 maps B frames of the time-frequency domain signal X(l,f), obtained from the buffer 212, to the signal X(l,f,q) by applying a B-point FFT to the B frames of X(l,f) per value of f. Notably, the number of frequency-domain samples (e.g., the number of sub-bins across the N/2 frequency bins) in X(l,f,q) is B*N/2, which has the same value as FFTsize_fine. For example, if B is 8 and N/2 is 64, then B*N/2=512; the number of frequency-domain samples in X(l,f,q) is the same number as if x(t) was transformed to X(l,f) using a 512-point FFT. Thus, multiple frames of the coarse domain signal X(l,f) can be mapped to the fine domain, resulting in a signal X(l,f,q) that simulates a fine domain signal suitable for the DNN implemented by the DNN module 218.

The decimation module 216 is configured to perform signal decimation on the signal X(l,f,q) by reducing the number of sub-bins per frequency bin in the signal X(l,f,q) by a factor D, where D is a whole number of two or greater, resulting in a decimated signal X'(l,f,q). That is, the number of sub-bins per frequency bin, and correspondingly the number of frequency-domain samples in X(l,f,q), is divided by D, so that the number of sub-bins per frequency bin in the decimated signal X'(l,f,q) is B/D (e.g., q=1, . . . , B/D). In some implementations, if the overlap rate at which the subband analysis module 210 transforms audio frames 202 is 50%, then D=2; the decimation module 216 halves the number of sub-bins per frequency bin, and thus the number of sub-bins per frequency bin is B/D=B/2 (e.g., q=1, . . . , B/2). For example, continuing with the above-described example in which f=1, . . . , 64 and B=8, decimation of the signal X(l,f,q) by D=2 results in a decimated signal X'(l,f,q) where f=1, . . . , 64 and q=1, . . . , 4 for each value of f. In some other implementations, D may be another power of 2 (e.g., D=4 if the overlap rate associated with the subband analysis module 210 is 75%). An example of signal decimation is described below with reference to FIG. 3.

The decimation module 216 may provide the decimated signal X'(l,f,q) as the input to the DNN module 218. In some implementations, the DNN module 218 may be one example of the DNN 122. Accordingly, the DNN module 218 is configured to determine, based on the decimated signal X'(l,f,q), a probability of speech dnn(l,f,q), where f=1, . . . , 64 and q=1, . . . , B/D. In some implementations, the probability of speech dnn(l,f,q) is a vector of probability values for each sub-bin, per frequency bin, where each probability value can be between 0 to 1, inclusive. In some implementations, the DNN implemented by the DNN module 218 may be trained on audio signals processed at a certain overlap rate (the DNN processes frames of signals at the overlap rate), and the decimation module 216 may provide the decimated signal X'(l,f,q) to the DNN module 218 at a frame hop based on that overlap rate and the window size associated with the DNN. For example, if the DNN processes signals at an overlap rate of 50% and the window size associated with the DNN is 32 ms, then the frame hop is 16 ms (50% of 32 ms). At a frame hop of 16 ms for the DNN module 218, and where the subband analysis module 210 operates with an 8 ms window size and a 50% overlap (thus outputting a frame every 4 ms), the DNN module 218 may process frames of X'(l,f,q) to output a probability of speech dnn(l,f,q)) at a rate of every 4 frames of X(l,f). By operating at a reduced rate relative to the subband analysis module 210, the DNN module 218 consumes less computational resources and power than if the DNN module 218 operates at the same rate as the subband analysis module 218.

The coarse domain mapping module 220 is configured to map the probability of speech dnn(l,f,q) in the fine domain to the coarse domain. In some implementations, the coarse domain mapping module 220 may map the probability of speech dnn(l,f,q) to the coarse domain by calculating an average (e.g., mean) of the probability values of the sub-bins per frequency bin as follows:

$$p(l, f) = \frac{1}{4}\sum_{q=1}^{4} dnn(l, f, q)$$

A mixer 222 is configured to apply the probability of speech p(l,f) in the coarse domain (f=1, . . . , 64) to the audio signal X(l,f) in the coarse domain to produce a speech signal Z(l,f):

$$Z(l,f)=X(l,f)p(l,f)$$

In some implementations, the speech enhancement system 200 may include a nonlinear filtering module 224. The nonlinear filtering module 224 may receive the speech signal Z(l,f) and probability of speech p(l,f) as inputs and may estimate a power spectral density of noise $P_n(l,f)$ as follows:

$$P_n(l, f) = p(l, f)P_n(l, f) + (1 - p(l, f))|X(l, f)|^2$$

The nonlinear filtering module 224 may use the power spectral density of noise $P_n(l,f)$ to further reduce noise in the speech signal Z(l,f). For example, the nonlinear filtering module 224 may subtract the power spectral density of noise $P_n(l,f)$ from the speech signal Z(l,f) using a spectral subtraction technique. An example suitable nonlinear filter may include, among other examples, a Gaussian mixture model (GMM) with spectral subtraction. The nonlinear filtering module 224 may output a filter output signal Y(l,f) that is a result of filtering the speech signal Z(l,f).

The subband synthesis module 226 is configured to transform the filter output signal Y(l,f) (or the speech signal Z(l,f), if the nonlinear filter 224 is bypassed or omitted from the speech enhancement system 200), from the time-frequency domain to the time domain. For example, the subband synthesis module 226 may transform a number N of time-frequency domain samples of Y(l,f) (or Z(l,f)), representing a frame of Y(l,f) (or Z(l,f)) in the time-frequency domain), to N time-domain samples representing an enhanced audio frame 204 of the enhanced audio signal y(t). In some implementations, the subband synthesis module 226 may perform the transformation from the time-frequency domain to the time domain using an inverse Fourier transform, such as an inverse FFT. The enhanced audio signal y(t) may be processed further and/or output into sound waves via a speaker.

In some implementations, the latency of the speech enhancement system 200 may be adjusted by modifying the coarse domain FFT size FFTsize_coarse. For example, if FFTsize_coarse is equal to 128 (corresponding to a window size of 8 ms) and the subband analysis module 210 operates with a 50% overlap, the speech enhancement system 200 will have a latency of 4 ms. If FFTsize_coarse is modified to be 64 (corresponding to a window size of 4 ms) and the overlap continues to be 50%, the speech enhancement system 200 will have a latency of 2 ms. If FFTsize_coarse is equal to 32 (corresponding to a window size of 2 ms) and the overlap continues to be 50%, the speech enhancement system 200 will have a latency of 1 ms. With the adjustment of FFTsize_coarse, the size B of the buffer 212 may change accordingly. For example, as FFTsize_coarse decreases, the size B of the buffer 212 may increase. Accordingly, the speech enhancement system 200 can be configured to satisfy target latency constraints of a device implementing the speech enhancement system 200 (e.g., the audio receiver 100, a PVAP) by adjusting FFTsize_coarse.

In some implementations, the power consumption of the speech enhancement system 200 may be adjusted by modifying the fine domain FFT size FFTsize_fine. For example, when the fine domain FFT size FFTsize_fine is equal to 512 (corresponding to a window size of 32 ms) and the DNN module 218 operates with a 50% overlap, the power consumption associated with the speech enhancement system 200 is approximately double the power consumption of the speech enhancement system 200 when the fine domain FFT size FFTsize_fine is equal to 1024 (corresponding to a window size of 64 ms). Accordingly, the speech enhancement system 200 can be configured to satisfy target power constraints of the device implementing the speech enhancement system 200 by adjusting FFTsize_fine. More generally, the speech enhancement system 200 can be configured to satisfy target latency and/or power constraints of a device implementing the speech enhancement system 200 by adjusting FFTsize_coarse and/or FFTsize_fine.

As described above, a fine domain signal X(l,f,q) can be decimated by the decimation module 216 to reduce redundancy in the signal before the signal is input into the DNN implemented by the DNN module 218. In some implementations, a scheme for signal decimation includes, for even frequency bins (e.g., even values of f), selecting a number (B/D) of sub-bins from the two ends of the range of values of the sub-bin index q (e.g., the first B/2D sub-bins and the last B/2D sub-bins) in the decimated signal X'(l,f,q). For odd frequency bins (e.g., odd values of f), a number (B/D) of sub-bins from a middle portion of the range of values of the sub-bin index q are selected in the decimated signal X'(l,f,q). The sub-bins that are not selected, and accordingly their corresponding frequency-domain samples, are discarded. The selected sub-bins, and accordingly their corresponding frequency-domain samples, are retained in the decimated signal X'(l,f,q). Thus, in an example where B=8 and D=2, for even frequency bins (e.g., even values of f), the first two and the last two sub-bins (e.g., q=1, 2, 7, 8) are selected for retention in the decimated signal X'(l,f,q). For odd frequency bins (e.g., odd values of f), the middle four sub-bins (e.g., q=3, 4, 5, 6) are selected for retention in the decimated signal X'(l,f,q). The sub-bins that are not selected for retention in the decimated signal X'(l,f,q) are discarded. In another example, where B=16 and D=2, for even frequency bins (e.g., even values of f), the first four and the last four sub-bins (e.g., q=1, 2, 3, 4, 13, 14, 15, 16) are selected for retention in the decimated signal X'(l,f,q). For odd frequency bins (e.g., odd values of f), the middle eight sub-bins (e.g., q=5, 6, 7, 8, 9, 10, 11, 12) are selected for retention in the decimated signal X'(l,f,q). The sub-bins that are not selected for retention in the decimated signal X'(l,f,q) are discarded.

In some implementations, the decimation module 216 may re-arrange sub-bins that are selected for inclusion in the decimated signal X'(l,f,q), in order to maintain a proper ordering of the frequencies corresponding to the sub-bins. Continuing with the decimation example above where B=8 and D=2, for the even frequency bins, the selected first two and last two sub-bins may be re-arranged so that the last-two sub-bins are placed before the first-two sub-bins in the decimated signal X'(l,f,q) (e.g., sub-bins 7, 8 are moved to come before the sub-bins 1, 2), and the sub-bins selected for the odd frequency bins are not re-arranged.

Figure 3:
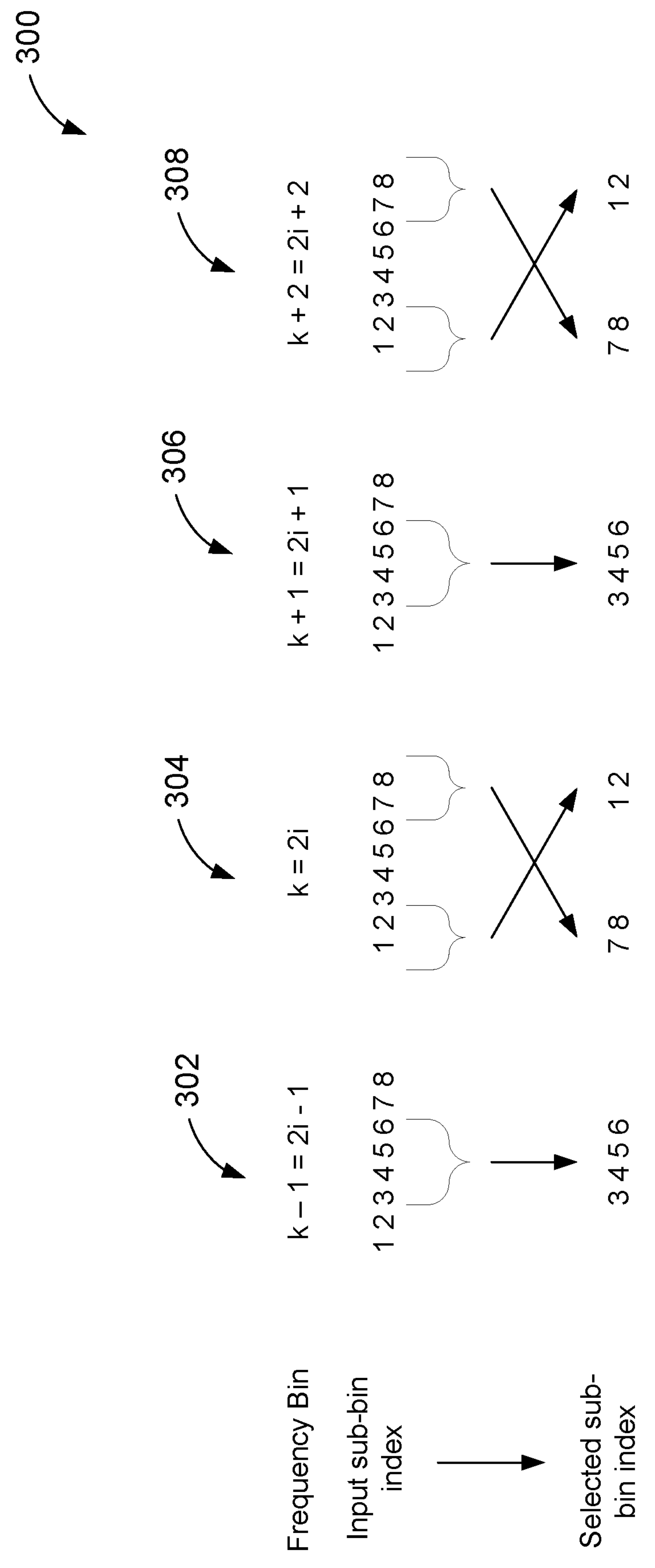
FIG. 3 shows an example operation for decimating a fine domain signal, according to some implementations.

FIG. 3 shows an example operation 300 for decimating a fine domain signal, according to some implementations. The operation 300 shows frequency bins 302, 304, 306, and 308 with frequency bin index values k−1, k, k+1, and k+2, respectively. Further as shown, FIG. 3 assumes values of B=8 and D=2. Frequency bins 302 and 306 are odd bins. As shown in FIG. 3, index value k−1 for frequency bin 302 is equal to an odd value 2i−1, and index value k+1 for frequency bin 306 is equal to an odd value 2i+1. On the other hand, frequency bins 304 and 308 are even bins. As shown in FIG. 3, index value k for frequency bin 304 is equal to an even value 2i, and index value k+2 for frequency bin 308 is equal to an even value 2i+2. For odd bins 302 and 306, sub-bins 3, 4, 5, 6 are selected for retention in the decimated signal X'(l,f,q) without re-arrangement; sub-bins 3, 4, 5, 6 maintain their original order in the decimated signal. For even bins 304 and 308, sub-bins 1, 2 and 7, 8 are selected for retention in the decimated signal X'(l,f,q) and re-arranged (e.g., swapped places) so that sub-bins 7, 8 occur before sub-bins 1, 2 in the decimated signal. The sub-bins that are not selected are discarded. Accordingly, the signal X(l,f,q), where q=1, . . . , 8, is decimated by half to the decimated signal X'(l,f,q), where q=1, . . . , 4.

In some other implementations, for even frequency bins (e.g., even values of f), the middle B/D sub-bins (e.g., q=3, 4, 5, 6 when B=8 and D=2) are selected and not re-arranged, and for odd frequency bins, the first B/2D and the last B/2D sub-bins (e.g., q=1, 2, 7, 8 when B=8 and D=2) are selected and re-arranged. In some other implementations, a scheme for signal decimation includes, for even frequency bins, selecting a number (B/D) of sub-bins from one end of the range of values of the sub-bin index q (e.g., the first B/D sub-bins) for inclusion in the decimated signal X'(l,f,q). For odd frequency bins, a number (B/D) of sub-bins from the opposite end of the range of values of the sub-bin index q (e.g., the last B/D sub-bins) are selected for inclusion in the decimated signal X'(l,f,q). Still further, in some implementations, none of the selected sub-bins are re-arranged. For example, for even frequency bins (e.g., even values of f), the first B/D sub-bins (e.g., q=1, 2, 3, 4 when B=8 and D=2) may be selected without re-arrangement, and for odd frequency bins, the last B/D sub-bins (e.g., q=5, 6, 7, 8 when B=8 and D=2) may be selected without re-arrangement.

Figure 4:
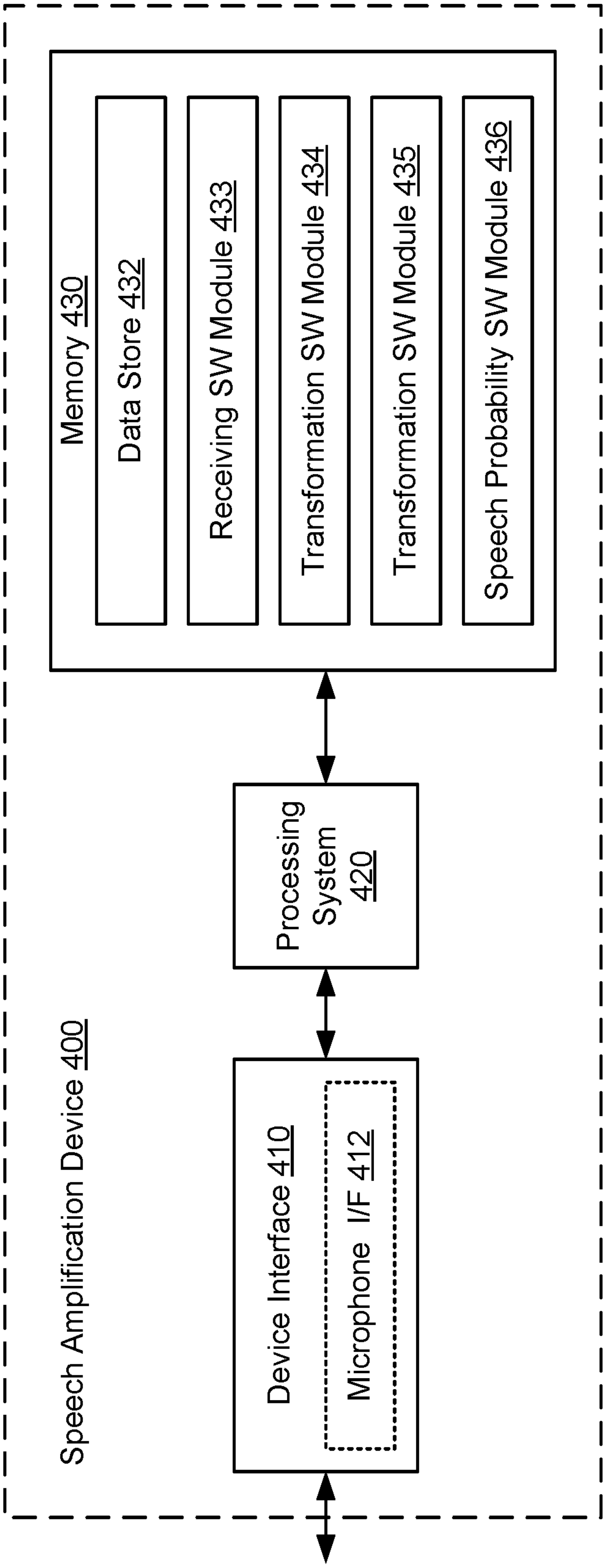
FIG. 4 shows another block diagram of an example speech enhancement system, according to some implementations.

FIG. 4 shows another block diagram of an example speech enhancement system 400, according to some implementations. More specifically, the speech enhancement system 400 may be configured to perform a low-latency speech enhancement operation that suppresses noise in a received audio signal. In some implementations, the speech enhancement system 400 may be one example of the speech enhancement component 120 of FIG. 1. The speech enhancement system 400 includes a device interface 410, a processing system 420, and a memory 430.

The device interface 410 is configured to communicate with one or more components of an audio receiver (such as the microphone 110 of FIG. 1). In some implementations, the device interface 410 may include a microphone interface (I/F) 412 configured to receive a single channel audio signal via a microphone. In some implementations, the microphone interface 412 may sample or receive individual frames of the audio signal at a frame hop associated with the speech enhancement system 400. For example, the frame hop may represent a frequency at which an application requires or otherwise expects to receive enhanced audio frames from the speech enhancement system 400.

The memory 430 may include an data store 432 configured to store one or more received frames of the audio signal as well as any intermediate signals or data that may be produced by the speech enhancement system 400 as a result of performing the low-latency speech enhancement operation (such as any of the audio signals, buffered frames, probabilities of speech, or enhanced signals described with reference to FIGS. 2 and 3). The memory 430 also may include a non-transitory computer-readable medium (including one or more nonvolatile memory elements, such as EPROM, EEPROM, Flash memory, or a hard drive, among other examples) that may store at least the following software (SW) modules:

- a receiving SW module 433 to receive a number (B) of frames of an input signal, each of the B frames including a number (N) of time-domain samples;
- a first transformation SW module 434 the B*N time-domain samples into B*N first frequency-domain samples based on an N-point fast Fourier transform (FFT);
- a second transformation SW module 435 to transform the B*N first frequency-domain samples into B*N second frequency-domain samples based on an MB-point FFT; and
- a speech probability SW module 436 to determine a probability of speech in the input signal based at least in part on the B*N second frequency-domain samples.

Each software module includes instructions that, when executed by the processing system 420, causes the speech enhancement system 400 to perform the corresponding functions.

The processing system 420 may include any suitable one or more processors capable of executing scripts or instructions of one or more software programs stored in the speech enhancement system 400 (such as in the memory 430). For example, the processing system 420 may execute the transformation SW module 434 to transform a set of samples of a signal, and may execute the DNN SW module 436 to infer a probability of speech associated with the received audio frame based on a neural network model.

Figure 5:
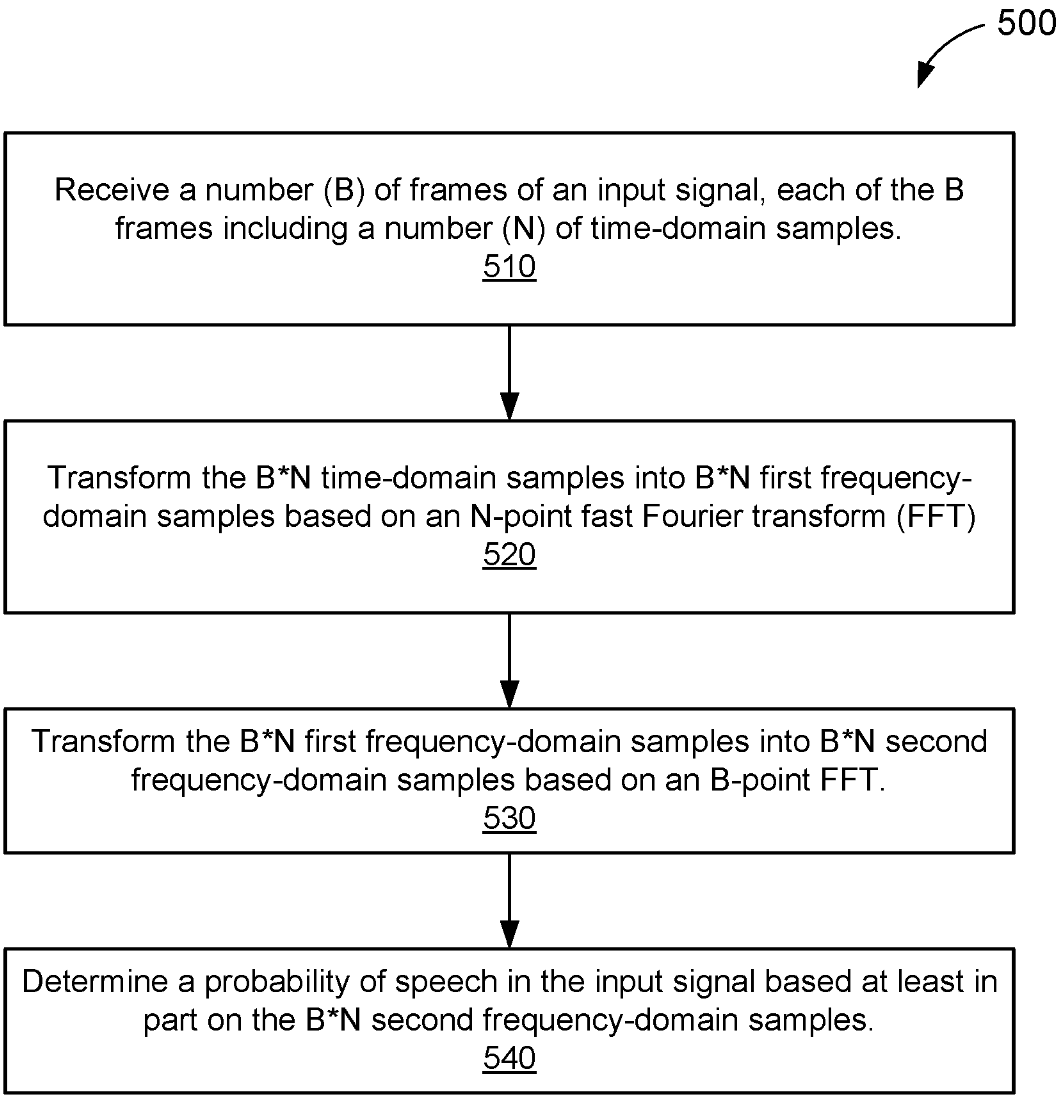
FIG. 5 shows an illustrative flowchart depicting an example operation for processing audio signals, according to some implementations.

FIG. 5 shows an illustrative flowchart depicting an example operation 500 for processing audio signals, according to some implementations. In some implementations, the example operation 500 may be performed by a speech enhancement system such as the speech enhancement component 120 of FIG. 1 or the speech enhancement system 200 of FIG. 2.

The speech enhancement system may receive a number (B) of frames of an input signal (510). Each of the B frames include a number (N) of time-domain samples. The speech enhancement system may transform the B*N time-domain samples into B*N first frequency-domain samples based on an N-point fast Fourier transform (FFT) (520). The speech enhancement system may transform the B*N first frequency-domain samples into B*N second frequency-domain samples based on an B-point FFT (530). Further, the speech enhancement system may determine a probability of speech in the input signal based at least in part on the B*N second frequency-domain samples (540).

In some aspects, the speech enhancement system may decimate the B*N second frequency-domain samples by a decimation factor (D), the probability of speech being determined based on the B*N/D decimated second frequency-domain samples. In some aspects, D=2.

In some aspects, the speech enhancement system, for a first frequency bin associated with the B*N second frequency-domain samples, may select a first subset of the second frequency-domain samples associated with a set of first sub-bin indices for inclusion in the B*N/D decimated second frequency-domain samples; and for a second frequency bin associated with the B*N second frequency-domain samples and succeeding the first frequency bin, may select a second subset of the second frequency-domain samples associated with a set of second sub-bin indices for inclusion in the B*N/D decimated second frequency-domain samples, wherein the second set of sub-bin indices differ from the first set of sub-bin indices.

In some aspects, the first frequency bin is an even frequency bin, and the second frequency bin is an odd frequency bin.

In some aspects, the selected first subset of the second frequency-domain samples includes a first group of B/2D contiguous samples and a second group of B/2D contiguous samples, and the selected second subset of the second frequency-domain samples includes a third group of B/D contiguous samples, and the speech enhancement system may re-arrange the selected first subset of the second frequency-domain samples by swapping positions of the first group of B/2D contiguous samples and the second group of B/2D contiguous samples.

In some aspects, the speech enhancement system may determine a respective probability of speech value associated with each of the B*N/D decimated second frequency-domain samples.

In some aspects, the speech enhancement system may determine a first average of the probability of speech values associated with a number (B/D) of the decimated second frequency-domain samples, wherein the B/D decimated second frequency-domain samples are associated with a first frequency bin.

In some aspects, the probability of speech in the input signal comprises a vector of probability of speech values including the first average.

In some aspects, the speech enhancement system may generate B*N enhanced frequency-domain samples based at least in part on the determined probability of speech and the B*N first frequency-domain samples.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for enhancing speech in an audio signal, comprising:

receiving a number (B) of frames of an input signal, each of the B frames including a number (N) of time-domain samples;

transforming the B*N time-domain samples into B*N first frequency-domain samples based on an N-point fast Fourier transform (FFT);

transforming the B*N first frequency-domain samples into B*N second frequency-domain samples based on a B-point FFT;

determining a probability of speech in the input signal based at least in part on the B*N second frequency-domain samples and a neural network trained to infer probabilities of speech from audio signals;

determining, via the neural network, a spectral suppression gain based on the determined probability of speech; and attenuating, via the neural network, noise associated with the input signal based on the determined spectral suppression pain.

2. The method of claim 1, wherein the determining of the probability of speech in the input signal comprises:

decimating the B*N second frequency-domain samples by a decimation factor (D), the probability of speech being determined based on the B*N/D decimated second frequency-domain samples.

3. The method of claim 2, wherein D=2.

4. The method of claim 2, wherein the decimating of the B*N second frequency-domain samples comprises:

for a first frequency bin associated with the B*N second frequency-domain samples, selecting a first subset of the second frequency-domain samples associated with a set of first sub-bin indices for inclusion in the B*N/D decimated second frequency-domain samples; and for a second frequency bin associated with the B*N second frequency-domain samples and succeeding the first frequency bin, selecting a second subset of the second frequency-domain samples associated with a set of second sub-bin indices for inclusion in the B*N/D decimated second frequency-domain samples, wherein the second set of sub-bin indices differ from the first set of sub-bin indices.

5. The method of claim 4, wherein the first frequency bin is an even frequency bin, and the second frequency bin is an odd frequency bin.

6. The method of claim 4, wherein the selected first subset of the second frequency-domain samples includes a first group of B/2D contiguous samples and a second group of B/2D contiguous samples, and the selected second subset of the second frequency-domain samples includes a third group of B/D contiguous samples, the method further comprising re-arranging the selected first subset of the second frequency-domain samples by swapping positions of the first group of B/2D contiguous samples and the second group of B/2D contiguous samples.

7. The method of claim 2, wherein the determining of the probability of speech in the input signal further comprises determining a respective probability of speech value associated with each of the B*N/D decimated second frequency-domain samples.

8. The method of claim 7, wherein the determining of the probability of speech in the input signal further comprises:

determining a first average of the probability of speech values associated with a number (B/D) of the decimated second frequency-domain samples, wherein the B/D decimated second frequency-domain samples is associated with a first frequency bin.

9. The method of claim 8, wherein the probability of speech in the input signal comprises a vector of probability of speech values including the first average.

10. The method of claim 1, further comprising:

generating B*N enhanced frequency-domain samples based at least in part on the determined probability of speech and the B*N first frequency-domain samples.

11. A speech enhancement system comprising:

a processing system; and a memory storing instructions that, when executed by the processing system, causes the speech enhancement system to:

receive a number (B) of frames of an input signal, each of the B frames including a number (N) of time-domain samples;

transform the B*N time-domain samples into B*N first frequency-domain samples based on an N-point fast Fourier transform (FFT);

transform the B*N first frequency-domain samples into B*N second frequency-domain samples based on a B-point FFT;

determine a probability of speech in the input signal based at least in part on the B*N second frequency-domain samples and a neural network trained to infer probabilities of speech from audio signals;

determine, via the neural network, a spectral suppression pain based on the determined probability of speech; and attenuate, via the neural network, noise associated with the input signal based on the determined spectral suppression gain.

12. The speech enhancement system of claim 11, wherein execution of the instructions further causes the speech enhancement system to:

decimate the B*N second frequency-domain samples by a decimation factor (D), the probability of speech being determined based on the B*N/D decimated second frequency-domain samples.

13. The speech enhancement system of claim 12, wherein D=2.

14. The speech enhancement system of claim 12, wherein execution of the instructions further causes the speech enhancement system to:

for a first frequency bin associated with the B*N second frequency-domain samples, select a first subset of the second frequency-domain samples associated with a set of first sub-bin indices for inclusion in the B*N/D decimated second frequency-domain samples; and for a second frequency bin associated with the B*N second frequency-domain samples and succeeding the first frequency bin, select a second subset of the second frequency-domain samples associated with a set of second sub-bin indices for inclusion in the B*N/D decimated second frequency-domain samples, wherein the second set of sub-bin indices differ from the first set of sub-bin indices.

15. The speech enhancement system of claim 14, wherein the first frequency bin is an even frequency bin, and the second frequency bin is an odd frequency bin.

16. The speech enhancement system of claim 14, wherein the selected first subset of the second frequency-domain samples includes a first group of B/2D contiguous samples and a second group of B/2D contiguous samples, and the selected second subset of the second frequency-domain samples includes a third group of B/D contiguous samples, and wherein execution of the instructions further causes the speech enhancement system to re-arrange the selected first subset of the second frequency-domain samples by swapping positions of the first group of B/2D contiguous samples and the second group of B/2D contiguous samples.

17. The speech enhancement system of claim 12, wherein execution of the instructions further causes the speech enhancement system to determine a respective probability of speech value associated with each of the B*N/D decimated second frequency-domain samples.

18. The speech enhancement system of claim 17, wherein execution of the instructions further causes the speech enhancement system to determine a first average of the probability of speech values associated with a number (B/D) of the decimated second frequency-domain samples, wherein the B/D decimated second frequency-domain samples are associated with a first frequency bin.

19. The speech enhancement system of claim 18, wherein the probability of speech in the input signal comprises a vector of probability of speech values including the first average.

20. The speech enhancement system of claim 11, wherein execution of the instructions further causes the speech enhancement system to generate B*N enhanced frequency-domain samples based at least in part on the determined probability of speech and the B*N first frequency-domain samples.

* * * * *